(12) United States Patent
Chou et al.

(10) Patent No.: US 9,216,438 B2
(45) Date of Patent: Dec. 22, 2015

(54) DIAMOND SCREENING APPARATUS

(71) Applicant: Kinik Company, Taipei (TW)

(72) Inventors: Jui-Lin Chou, New Taipei (TW); Chia Chun Wang, New Taipei (TW); Chia-Feng Chiu, New Taipei (TW); Wen-Jen Liao, New Taipei (TW); Jen Feng Chen, New Taipei (TW)

(73) Assignee: KINIK COMPANY, Taipei (TW)

( * ) Notice: Subject to any disclaimer, the term of this patent is extended or adjusted under 35 U.S.C. 154(b) by 81 days.

(21) Appl. No.: 14/168,360

(22) Filed: Jan. 30, 2014

(65) Prior Publication Data

US 2015/0041372 A1 Feb. 12, 2015

(30) Foreign Application Priority Data

Aug. 7, 2013 (TW) .............................. 102128225 A

(51) Int. Cl.
| | |
|---|---|
| *B07C 5/342* | (2006.01) |
| *B25J 15/06* | (2006.01) |
| *B25J 9/00* | (2006.01) |
| *G05B 19/418* | (2006.01) |
| *G06T 7/00* | (2006.01) |

(52) U.S. Cl.
CPC ............. *B07C 5/3422* (2013.01); *B25J 9/0093* (2013.01); *B25J 15/0616* (2013.01); *G05B 19/4182* (2013.01); *G06T 7/0006* (2013.01); *G05B 2219/40554* (2013.01); *G05B 2219/40564* (2013.01); *G05B 2219/40607* (2013.01); *G06T 2207/30108* (2013.01)

(58) Field of Classification Search
CPC ....................................................... B07C 5/342
USPC ......................................... 209/576, 577, 938
See application file for complete search history.

(56) References Cited

U.S. PATENT DOCUMENTS

| | | | | |
|---|---|---|---|---|
| 5,603,414 | A * | 2/1997 | Rooney ................. | G01N 23/14 209/588 |
| 7,778,458 | B2 * | 8/2010 | Hiraoka .................... | B07C 5/14 382/141 |
| 8,916,049 | B2 * | 12/2014 | Nishijima ............... | B03C 1/286 209/214 |
| 2008/0140248 | A1 * | 6/2008 | Moore ...................... | B07C 5/14 700/223 |
| 2014/0169697 | A1 * | 6/2014 | Breckenridge ......... | G06T 11/60 382/284 |

\* cited by examiner

*Primary Examiner* — Terrell Matthews
(74) *Attorney, Agent, or Firm* — Muncy, Geissler, Olds & Lowe, P.C.

(57) ABSTRACT

The present invention relates to a diamond screening apparatus, comprising: a working platform comprising a working plane; a conveyer disposed on the working plane of the working platform for carrying a diamond matrix unit; an image capture device forming one or a plurality of captured images in different regions of the diamond matrix unit; a display device; and an image recognition module, which is electrically connected to the image capture device and the display device, performs a geometric feature parameter analysis on the captured images to determine one or a plurality of risk diamonds of the diamond matrix unit.

12 Claims, 4 Drawing Sheets

| 19 | 18 | 7  | 6 |
|----|----|----|---|
| 20 | 17 | 8  | 5 |
| 21 | 16 | 9  | 4 |
| 22 | 15 | 10 | 3 |
| 23 | 14 | 11 | 2 |
| 24 | 13 | 12 | 1 |

FIG.2A

| 19 | 18 | 7  | 6 |
|----|----|----|---|
| 20 | 17 | 8  | 5 |
| 21 | 16 | 9  | 4 |
| 22 | 15 | 10 | 3 |
| 23 | 14 | 11 | 2 |
| 24 | 13 | 12 | 1 |

FIG.2B

DIAMOND SCREENING APPARATUS

CROSS REFERENCE TO RELATED APPLICATION

This application claims the benefits of the Taiwan Patent Application Serial Number 102128225, filed on Aug. 7, 2013, the subject matter of which is incorporated herein by reference.

BACKGROUND OF THE INVENTION

1. Field of the Invention

The present invention relates to a diamond screening apparatus and, more particularly, to a diamond screening apparatus for screening diamond particles which is used to prepare a chemical mechanical polishing conditioner.

2. Description of Related Art

Chemical mechanical polishing (CMP) is a common polishing process in various industries, which can be used to grind the surfaces of various articles, including ceramics, silicon, glass, quartz, or a metal chip, etc. In addition, with the rapid development of integrated circuits, chemical mechanical polishing becomes one of the common techniques for wafer planarization due to its ability to achieve whole planarization.

During the chemical mechanical polishing process of semiconductor, impurities or uneven structure on the surface of a wafer are removed by contacting the wafer (or the other semiconductor elements) with a polishing pad and using a polishing liquid if necessary, through the chemical reaction and mechanical force. When the polishing pad has been used for a certain period of time, the polishing performance and efficiency are reduced because the debris produced in the polishing process may accumulate on the surface of the polishing pad. Therefore, a conditioner can be used to condition the surface of the polishing pad, such that the surface of the polishing pad is re-roughened and maintained at an optimum condition for polishing. In the process for manufacturing a conditioner, it is necessary to dispose an abrasive layer by mixing abrasive particles and a binding layer on the substrate surface, and to fix the abrasive layer to the surface of the substrate by brazing or sintering methods. During the manufacturing process of the above conditioner, or when the conditioner conditions a polishing pad, the diamond particles on the conditioner may be broken to form risk diamonds, such that the conditioner may become a defective one. Therefore, it is necessary to implement a detection process for ensuring an expected polishing performance in the subsequent steps. It is a known method to use an optical microscope (OM) to perform a visual observation whether a pad conditioner has any risk diamond. When risk diamonds are observed, the positions would be marked by a marked method (such as oil pen) and taken a photograph. Finally, the photos taken before and after the grinding process would be compared by a person.

In the known technology, it discloses an equipment for detecting a defect of a polishing pad conditioner, comprising a working platform, a placement base and an image capture device disposed on the working platform, a display module, and an image processing unit. The image processing unit includes an image recognition module, a data storage device and a comparison module, wherein the data storage device is electrically connected with the image recognition module and the comparison module, and stores a plurality of reference image data. The image recognition module transfers the sample image to a sample image data having the same format as the reference image data. The comparison module executes a comparison of the sample image data and the corresponded reference image data to determine whether any one of the sample image data has any defect. The sample images having defects and without defects would be separately marked and shown in the display module.

In addition, the other known technology, it discloses a detection apparatus and method of chemical mechanical polishing conditioner, comprising: a working platform with a working plane; a placement base disposed on the working plane of the working platform for carrying a chemical mechanical polishing conditioner; an image capture device disposed on the placement base of the working platform, and the image capture device and placement base relatively parallel to the working plane for forming one or a plurality of captured images in different regions of the chemical mechanical polishing conditioner; a display device; an image recognition module connected electrically to the image capture device and the display device; wherein the captured image is performed a color matching the captured images by the image recognition module to determine one or a plurality of risk diamond on the chemical mechanical polishing conditioner, and the coordinate locations of the risk diamonds are outputted to the display device; and a mobile platform used to move the risk diamonds to specified locations which are the coordinate location outputted by the image recognition module.

However, the above detection apparatus is used to perform a detection of risk diamonds on a prepared chemical mechanical polishing conditioner. Even though the risk diamond can be removed by an appropriate removal device, the productivity of the chemical mechanical polishing conditioner cannot still be effectively improved. Thus, there is a demand to develop a screening and detecting apparatus for risk diamonds and a method using the same, wherein the risk diamonds can be removed before a brazing process to avoid producing scratches and breakages caused by the risk diamonds during a chemical mechanical polishing process.

SUMMARY OF THE INVENTION

The object of the present invention is to provide a diamond screening apparatus which is used to detect and determine whether there is any risk diamond present in diamond particles capable of using to prepare a chemical mechanical polishing conditioner, and then the risk diamond would be removed from the diamond particles to further avoid producing scratches and breakages on a polishing pad during chemical mechanical polishing process.

Conventionally, the method for detecting risk diamonds is to directly detect diamonds brazed on a chemical mechanical polishing conditioner and to remove risk diamonds from the chemical mechanical polishing conditioner by an appropriate tool, such as high power laser or a water jet. Although the method can ensure that there is no risk diamond on the final product of the chemical mechanical polishing conditioner, the condition efficiency of the chemical mechanical polishing conditioner to a polishing pad cannot be maintained if there are too many risk diamonds on the chemical mechanical polishing conditioner. Moreover, even if the risk diamonds are removed by the known method for detecting risk diamonds, the yield of the product cannot be increased and the productivity of the product may also be decreased. Therefore, it is necessary to develop a diamond screening apparatus capable of detecting and removing risk diamonds and ensuring the yield and the productivity of the prepared chemical mechanical polishing conditioner.

To achieve the above object, the diamond screening apparatus of the present invention includes: a working platform comprising a working plane; a conveyer disposed on the working plane of the working platform for carrying a diamond matrix unit; an image capture device disposed on the working platform, wherein the image capture device and the conveyer are relatively parallel to the working plane for forming one or a plurality of captured images in different regions of the diamond matrix unit; a display device; and an image recognition module electrically connected to the image capture device and the display device, wherein the captured image is performed a geometric feature parameter analysis by the image recognition module to determine one or a plurality of risk diamonds of the diamond matrix unit. Thus, the diamond matrix unit to be detected is disposed on the conveyer when the diamond screening apparatus is operated, and one or a plurality of captured images in different regions of the diamond matrix unit are formed by the image capture device. Then the captured images are transferred to the image recognition module which can determine the risk diamonds according to the geometric feature parameters, and the positions of the risk diamonds can be confirmed by a general position control system. In particular, when the geometric feature parameter analyzed by the image recognition module is out of a standard parameter, the diamond particles corresponding to the geometric feature parameter may be risk diamonds. For example, in an aspect of the present invention, the shape and contour of each diamond particle can be captured by the image recognition module; so that the geometric feature parameter of each diamond particle can be obtained. Then, the diamond particles having the geometric feature parameters greater than or less than the standard parameter can to screened by the image recognition module according to a standard parameter to determine the diamond particles to be the risk diamonds, and the coordinate positions of the risk diamonds can be confirmed by a general position control system.

In the diamond screening apparatus of the present invention, the risk diamond may be a twin-structure or an internal crack structure. The geometric feature parameter of the risk diamond different from a normal diamond having a prefect crystal may be greater than or less than the parameter of the geometric feature parameter of the normal diamond. Therefore, any geometric feature parameter for defining diamond particles can be used as long as it can be used to determine the risk diamonds. For example, in an aspect of the present invention, the geometric feature parameters may be circularity, ellipticity, sphericity, aspect ratio, roughness, equivalent diameter, maximum/most effective diameter, rectangle degree, form factor, optical characteristic, or a combination thereof. In particular, in an aspect of the present invention, the geometric feature parameters may be ellipticity and aspect ratio. Accordingly, after obtaining the geometric feature parameter of each diamond through the captured images, those skilled in the art can set a standard parameter based on the user's requirements to screen the risk diamonds having the geometric feature parameter greater than or less than the standard parameter. At the same time, the coordinate positions of the risk diamonds in the diamond matrix can be confirmed by a general position control system.

In the diamond screening apparatus of the present invention, one or a plurality of captured images in different regions of the diamond matrix unit may be formed by the image capture device. The amounts of the captured images may be randomly varied based on the resolution of the image capture device or the user's requirements, such as 1, 12, 24, 54, or 108 captured images, but the present invention is not limited thereto. In an aspect of the present invention, 24 captured images in different regions of the diamond matrix unit may be formed by the image capture device; namely, the diamond matrix unit is divided into 24 regions for forming 24 captured images. In another aspect of the present invention, 54 captured images in different regions of the diamond matrix unit may be formed by the image capture device; namely, the diamond matrix unit is divided into 54 regions for forming 54 captured images. In yet another aspect of the present invention, 108 captured images in different regions of the diamond matrix unit may be formed by the image capture device; namely, the diamond matrix unit is divided into 108 regions for forming 108 captured images. Also, in another aspect of the present invention, if the image capture device has high magnification resolution, the image capture device may form 1 captured image in different regions of the diamond matrix unit, namely, the diamond matrix unit is considered one region for forming 1 captured image.

In the diamond screening apparatus of the present invention, the image capture device may be a charge couple device (CCD) or an industrial camera for forming one or a plurality of captured images in different regions of the diamond matrix unit. In an aspect of the present invention, the image capture device may be a charge couple device. In addition, the captured image of any data type can be used as long as the captured image is clear enough to obtain appropriate parameters of the geometric features, but the present invention is not limited thereto. For example, in an aspect of the present invention, the captured image may be a color format data, a gray-scale format data, or a threshold format data.

In the diamond screening apparatus of the present invention, the diamond screening apparatus further include a pick and place device that may be used to remove the risk diamonds from the diamond matrix unit according to a coordinate position outputted from the image recognition module. Thus, the risk diamonds brazed on a chemical mechanical polishing conditioner in the subsequent process may be avoided. In addition, after the risk diamonds are removed from the diamond matrix unit by the abovementioned diamond screening apparatus of the present invention, the pick and place device may fill normal diamonds on the positions on which the risk diamonds are removed. Therefore, the decrease of the condition efficiency of the prepared chemical mechanical polishing conditioner due to the vacancy caused by the removal of the risk diamonds may be avoided. The above mentioned pick and place device of the present invention may be a vacuum suction device or an automatic manipulator, but the present invention is not limited thereto. In an aspect of the present invention, the pick and place device may be a vacuum suction device. In another aspect of the present invention, the pick and place device may be an automatic manipulator.

In the diamond screening apparatus of the present invention, the diamond matrix unit may be moved through the conveyer to implement a batch, a semi-batch or a continuous diamond screening process. For example, in an aspect of the present invention, the determination of the risk diamonds of the diamond matrix unit may be accomplished in one working station, and then the diamond matrix unit may be moved to the next working station by the conveyer to carry out the removal of the risk diamonds and the filling of the normal diamonds. In another aspect of the present invention, the determination of the risk diamonds of the diamond matrix unit, the removal of the risk diamonds and the filling of the normal diamonds may be sequentially accomplished in one working station. In yet another aspect of the present invention, the determination of the risk diamonds of the diamond matrix unit may be accomplished in one working station, and then the diamond matrix unit may be moved to the next working station by the conveyer to carry out the removal of the risk diamonds. Finally, the diamond matrix unit may be move to the next working station by the conveyer to carry out the filling of the normal diamonds. However, it should be understood that the configuration of the working station may be regulated by those skilled in the art according to practical conditions and requirements of the production line to maximize the productivity thereof, but the present invention is not limited thereto.

In the diamond screening apparatus of the present invention, all kinds of methods for building up the diamond matrix may be used as long as the diamonds can be arrayed in a matrix, but the present invention is not limited thereto. For example, in an aspect of the present invention, the diamonds may be arrayed on an adhesive substrate to build up the diamond matrix unit. That is, the diamond matrix unit may include an adhesive substrate and a plurality of diamonds disposed on the adhesive substrate. In the diamond screening apparatus of the present invention, the diamonds are arranged on the adhesive substrate, which is favorable for the diamonds of the diamond matrix unit transferred and fixed to a diamond tool by transferred pasting method in subsequent process. For example, the screened diamond matrix unit is attached to a binding layer of a chemical mechanical polishing conditioner (such as solder layer) and the diamond particles on the diamond matrix unit are faced toward the chemical mechanical polishing conditioner. Then, the adhesive substrate is removed so that the diamond particles are adhered and fixed on the binding layer of the chemical mechanical polishing conditioner, and the chemical mechanical polishing conditioner (namely, a diamond tool) may be formed by a brazing process. In addition, the shape of the diamond matrix unit may be varied by those skilled in the art on the basis of the practical operation process, but the present invention is not also particularly limited thereto. For example, in an aspect of the present invention, the diamond matrix unit may be circular, rectangular, triangular, polygonal, and the like. Preferably, in one particular aspect, the diamond matrix unit may be rectangular. Or in another particular aspect, the diamond matrix unit may be circular in order to match the chemical mechanical polishing conditioner but the present invention is not limited thereto.

In summary, the diamond screening apparatus of the present invention may be used to detect and determine whether there is any risk diamond present in diamond particles used to prepare a chemical mechanical polishing conditioner. Further, the risk diamonds would be removed from the diamond particles to avoid producing scratches and breakages on a polishing pad during chemical mechanical polishing process.

BRIEF DESCRIPTION OF THE DRAWINGS

FIG. 2A is a schematic diagram of the captured image of the diamond matrix unit of the Example 1 of the present invention;

FIG. 2B is a schematic diagram of the captured image of the diamond matrix unit of the Example 2 of the present invention.

DETAILED DESCRIPTION OF THE PREFERRED EMBODIMENT

Hereinafter, the actions and the effects of the present invention will be explained in more detail via specific examples of the invention. However, these examples are merely illustrative of the present invention and the scope of the invention should not be construed to be defined thereby.

Example 1

Figure 1A:
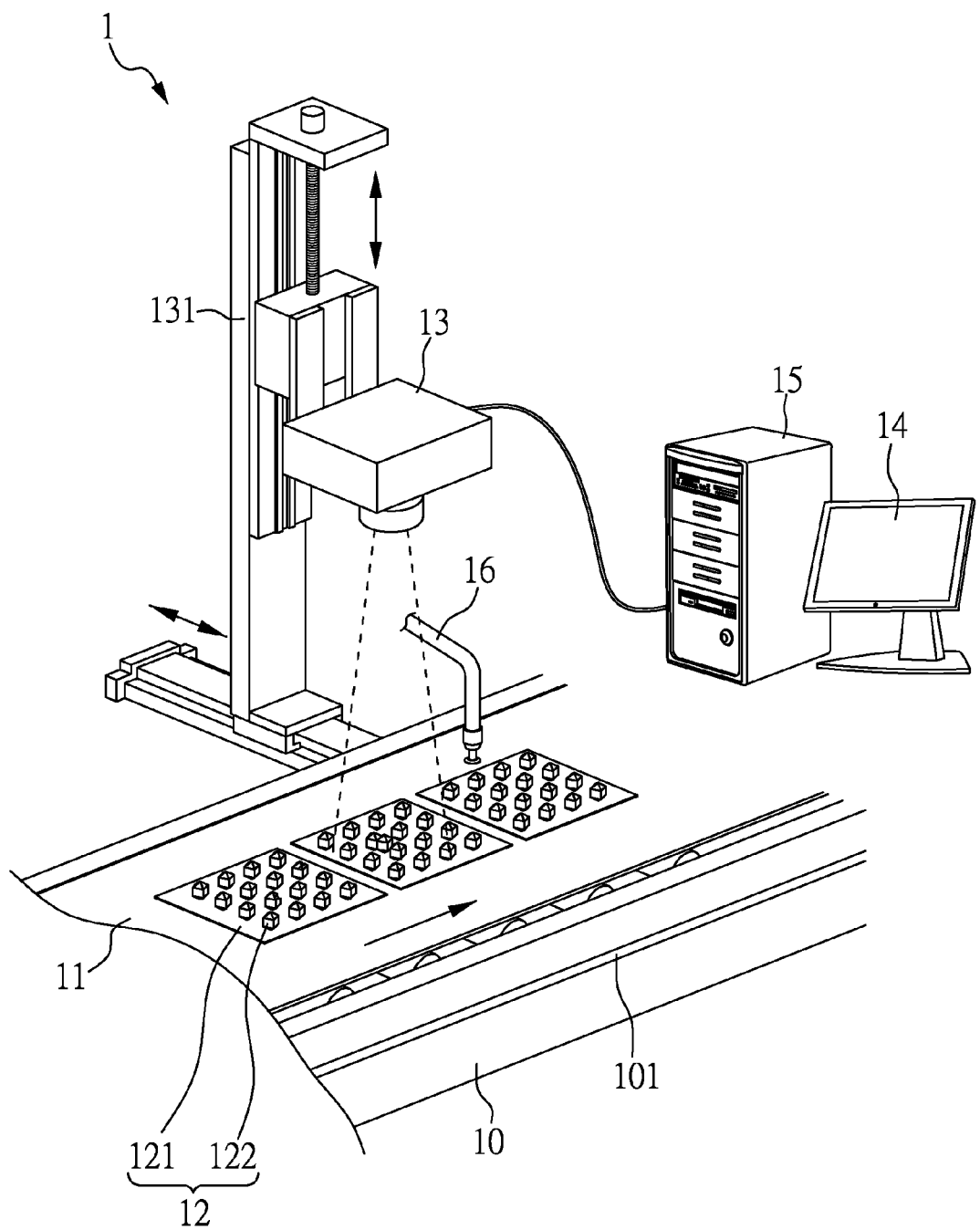
FIG. 1A is a perspective view of the diamond screening apparatus of the present invention.

The diamond screening apparatus of the present invention may be used to determine whether there is any risk diamond in diamond particles used to prepare a chemical mechanical polishing conditioner, and the risk diamonds would be removed from the diamond particles to avoid producing scratches and breakages on a polishing pad during chemical mechanical polishing process. Please refer to FIG. 1A, FIG. 1A is a perspective view of the diamond screening apparatus 1 of the present invention. As shown in FIG. 1A, the diamond screening apparatus 1 comprises: a working platform 10 comprising a working plane 101; a conveyer 11 disposed on the working plane 101 of the working platform 10 for carrying a diamond matrix unit 12, wherein the diamond matrix unit 12 includes an adhesive substrate 121 and a plurality of diamonds 122; an image capture device 13 disposed on the working platform 10, wherein the image capture device 13 can movably install on one side of the working platform 10 by a shifting mechanism 131, and the image capture device 13 and the conveyer 11 are relatively parallel to the working platform 10 to form one or a plurality of captured images in different regions of the diamond matrix unit 12; a display device 14; and an image recognition module 15, which is electrically connected to the image capture device 13 and the display device 14, performs a geometric feature parameter analysis to the captured images to determine one or a plurality of risk diamonds of the diamond matrix unit 12.

Figure 1B:
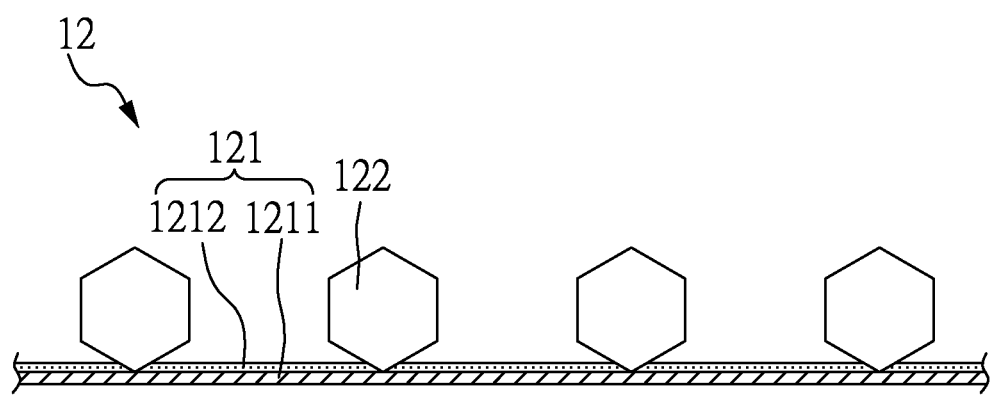
FIG. 1B is a schematic diagram of the diamond matrix unit to be detected of the present invention.

Also, refer to FIG. 1B, since the diamond particles 122 on the diamond matrix unit 12 are temporarily fixed on an adhesive substrate 121 by an adhesive layer 1212 coated on a substrate 1211 or the diamonds 122 are directly attached on a low adhesion tap (not shown), the diamond particles 122 can be picked and placed by any prior methods. As shown in FIG. 1A, in Example 1, the diamond screening apparatus 1 includes a vacuum suction device as the pick and place device 16. The pick and place device 16 can remove the risk diamonds recognized by the diamond screening apparatus from the diamond matrix unit 12 according to the coordinate positions outputted from the image recognition module 15. Thus, it can avoid remaining the risk diamonds on a chemical mechanical polishing conditioner in subsequent process. At the same time, after the risk diamonds are removed from the diamond matrix unit 12, the pick and place device 16 fills normal diamonds on the positions from which the risk diamonds are removed. Therefore, the decrease of the condition efficiency of the prepared chemical mechanical polishing conditioner due to the vacancy caused by the removal of the risk diamonds can be avoided.

In the abovementioned diamond screening apparatus of the present invention, the image capture device 13 may form one or a plurality of captured images in different regions of the diamond matrix unit 12. The amounts of the captured images may be randomly varied according the resolution of the image capture device or the user's measurement standard requirements, such as 1, 12, 24, 54, or 108 captured images, but the present invention is not limited thereto. Also, refer to FIG. 2A, in Example 1, the diamond matrix unit 12 is circular, and the image capture device 13 forms 24 captured images in different regions of the diamond matrix unit 12. That is, the diamond matrix unit 12 is divided into 24 regions for forming 24 captured images.

Figure 3:
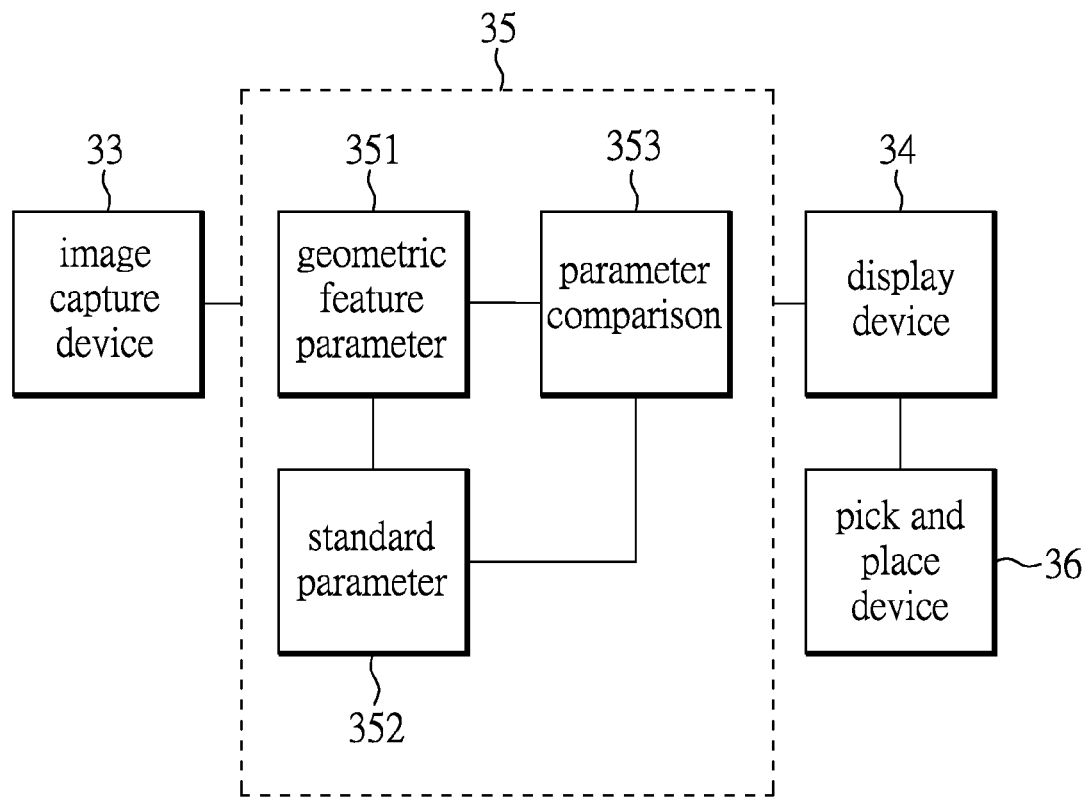
FIG. 3 is a flow chart of the diamond screening apparatus of the present invention.

Refer to FIG. 3, FIG. 3 is the flow chart of the diamond screening apparatus of the present invention. As shown in FIG. 3, when manipulating the diamond screening apparatus (referring to FIG. 1A), the diamond matrix unit to be detected is disposed on the conveyer 11, and one or a plurality of captured images in different regions of the diamond matrix unit are formed by the image capture device 33. Then, the captured images are transferred to the image recognition module 35 for obtaining the geometric feature parameter (such as ellipticity, aspect ratio, and the like) of each diamond in the captured images. The geometric feature parameter 351 and a standard parameter 352 set by the user would be carried out a parameter comparison 353 to determine whether the diamond particles of the diamond matrix unit corresponding to the geometric feature parameter is a risk diamond. That is, when the ellipticity or the aspect ratio of each diamond in the captured images is out of the standard parameter 352 set by the user, the diamond particles would be determined to be risk diamonds by the image recognition module 35. In addition, the coordination position of the risk diamond is confirmed by a general position control system at the same time. Then, the image recognition module 35 transfers the above mentioned results to a display device 34 to show the geometric feature parameter of each diamond, the result thereof, and the coordination position of each risk diamond. After that, the coordination position of each risk diamond is transferred to the pick and place device 36 to remove each risk diamond and fill a normal diamond on the position from which each risk diamond is removed. Thus, the decrease of the condition efficiency of the prepared chemical mechanical polishing conditioner due to the vacancy caused by the removal of the risk diamonds can be avoided.

Example 2

Beside the diamond matrix unit of Example 2 is rectangular for being favorable to transfer the diamond matrix unit to a non-circular diamond tool, the content of Example 2 is substantially similar to that of Example 1 mentioned above.

Accordingly, refer to FIG. 2B and FIG. 1A, the diamond matrix unit of Example 2 is also divided into 24 regions to form 24 captured images by the image captured device 13. Then, as shown in FIG. 3, Example 2 is similar to Example 1. In Example 2, the captured images are also transferred to the image recognition module 35. The geometric feature parameter 351 of each diamond in the captured images obtained by the image recognition module 35 and a standard parameter 352 set by the user would be carried out a parameter comparison 353 to determine whether the diamond corresponded to the geometric feature parameter on the diamond matrix unit is a risk diamond. The coordination position of the risk diamond is confirmed by a general position control system (not shown) at the same time. Then, the image recognition module 35 transfers the above mentioned results to a display device 34 to show the geometric feature parameter of each diamond, the results thereof, and the coordination position of each risk diamond. After that, the coordination position of each risk diamond is transferred to the pick and place device 36 to remove the each risk diamond and fill a normal diamond on the position from which the each risk diamond is removed. Thus, the decrease of the condition efficiency of the prepared chemical mechanical polishing conditioner due to the vacancy caused by the removal of the risk diamonds can be avoided.

Although the present invention has been explained in relation to its preferred embodiment, it is to be understood that many other possible modifications and variations can be made without departing from the spirit and scope of the invention as hereinafter claimed.

What is claimed is:

1. A diamond screening apparatus, comprising:
   a working platform comprising a working plane;
   a conveyer disposed on the working plane of the working platform to carry a diamond matrix unit;
   an image capture device disposed on the working platform, wherein the image capture device and the conveyer are relatively parallel to the working plane to form one or a plurality of captured images in different regions of the diamond matrix unit;
   a display device;
   an image recognition module, which is electrically connected to the image capture device and the display device, performs a geometric feature parameter analysis to the captured images to determine one or a plurality of risk diamonds of the diamond matrix unit; and
   a pick and place device that is used to remove the risk diamonds from the diamond matrix unit according to a coordinate position outputted from the image recognition module.

2. The diamond screening apparatus as claimed in claim 1, wherein the risk diamonds are determined by the image recognition module according to the geometric feature parameter.

3. The diamond screening apparatus as claimed in claim 1, wherein the risk diamonds are the geometric feature parameter analyzed by the image recognition module out of a standard parameter.

4. The diamond screening apparatus as claimed in claim 1, wherein the geometric feature is circularity, ellipticity, sphericity, aspect ratio, roughness, equivalent diameter, maximum/most effective diameter, rectangle degree, shape factor, optical characteristic, or a combination thereof.

5. The diamond screening apparatus as claimed in claim 1, wherein the risk diamonds have a twin-structure or an internal crack structure.

6. The diamond screening apparatus as claimed in claim 1, wherein the pick and place device fills normal diamonds on the position from which the risk diamonds are removed after the risk diamonds are removed from the diamond matrix unit.

7. The diamond screening apparatus as claimed in claim 4, wherein the pick and place device is a vacuum suction device or an automatic manipulator.

8. The diamond screening apparatus as claimed in claim 1, wherein the captured images are a color format data, a gray scale format date, or a threshold format data.

9. The diamond screening apparatus as claimed in claim 1, wherein the image capture device is a charge coupled device (CCD) or an industrial camera.

10. The diamond screening apparatus as claimed in claim 1, wherein the diamond matrix unit includes an adhesive substrate and a plurality of diamond particles disposed on the adhesive substrate.

11. The diamond screening apparatus as claimed in claim 9, further comprising the diamond particles of the diamond matrix unit which are transferred and fixed to a diamond tool by transferred pasting method.

12. The diamond screening apparatus as claimed in claim 10, wherein the diamond tool is a chemical mechanical polishing conditioner.

* * * * *